Patented May 20, 1930

1,759,161

UNITED STATES PATENT OFFICE

FRANZ LANG, OF STUTTGART, GERMANY, ASSIGNOR TO ACRO AKTIENGESELLSCHAFT, OF KÜSSNACHT AM RIGI, SWITZERLAND

OIL ENGINE WITH FUEL INJECTION

Application filed March 6, 1926, Serial No. 92,758, and in Germany March 16, 1925.

The present invention relates to an oil engine with fuel injection and having connected with the combustion chamber a mixing chamber, which in view of the direction of the fuel jet is arranged in advance of the mouth of the injection nozzle. From said mixing chamber fuel and air are forced through one or more throttling apertures, contractions or the like into a supplemental combustion chamber, which is attached to the cylinder casing or cover or provided within the piston.

It is essential in engines of this kind, that towards the end of the compression stroke a good whirling and mixing of oil and air may occur before this mixture enters the supplemental combustion chamber. For this purpose it is necessary to force the stream of oil and air through an inlet with throttling cross sectional area into the supplemental combustion chamber.

During the working stroke, however, the conditions are just reversed. The ignited mixture should expand and issue from the additional combustion chamber, as far as possible without throttling losses, when driving the piston. Accordingly the cross sectional area for the passage of the charge or mixture from the chamber into the cylinder must be essentially larger than the cross sectional area at the end of the compression stroke, in order to utilize the working effect of the mixture as far as possible.

This hitherto unknown difference of the passage cross sections for the mixture or charge at the compression stroke and at the working stroke form the essence of the present invention.

In the accompanying drawing, in which three forms of construction of the subject matter of the application are illustrated, the parts, which are not necessary for the understanding of the invention, as for instance the inlet and and discharge valves, the driving mechanism etc. have been omitted for the sake of simplicity.

In said drawing all three modifications are illustrated in vertical section and in all figures the cylinder is indicated by Z, the piston vertically reciprocating in said cylinder by $f$ and the injection nozzle, arranged in the cover of the cylinder, by $b$. Behind the mouth of the injection nozzle a mixing chamber $c$ is arranged, which is connected with the combustion chamber in the cylinder space and which communicates through a throttling contraction with the supplemental or additional combustion chamber $a$.

Figure 1:
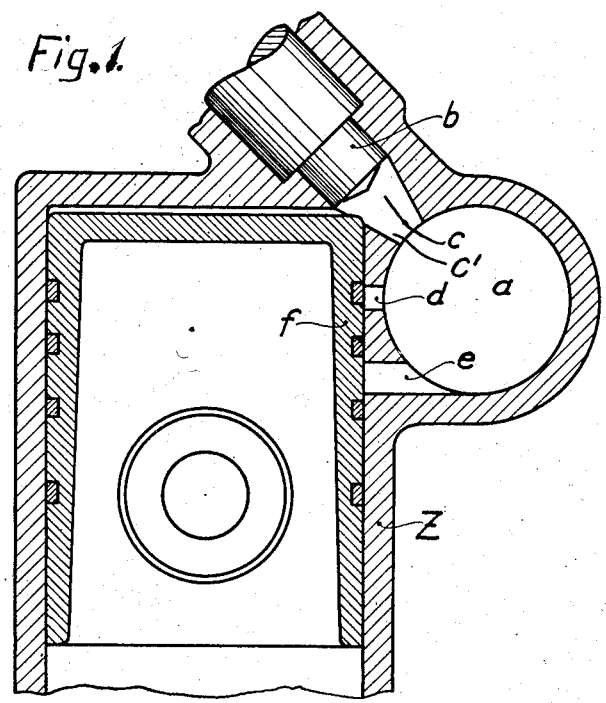

In the first form of construction according to Fig. 1 the injection nozzle $b$ is arranged on the circumference of the cylinder obliquely to the axis of the same. The additional combustion chamber is arranged laterally to the cylinder casing and is connected with the cylinder by the mixing chamber $c$ and by the channels $d$ and $e$, as long as the piston $f$ does not cover said two channels.

The operation of the described arrangement is as follows:

During the compression stroke the previously sucked air is compressed and is forced into the combustion chamber. When the openings or channels $e$ and $d$ are covered by the piston $f$ the air driven by said piston can enter into the additional combustion chamber $a$ only through the mixing chamber $c$.

The fuel injected at this period now mixes with the air current in the mixing chamber and the resulting mixture then passes through the throttling contraction, while being vehemently whirled, into the combustion space, where it is ignited. The arising increase of pressure first propagated through the mixing chamber into the cylinder and forces the piston downwardly, so that, after the openings $d$ and $e$ subsequently have become uncovered by the piston, the burning mixture can also flow through them into the cylinder.

On account of the provision of the openings $d$ and $e$ the discharge of the entire contents of the supplemental combustion chamber through the throttling contraction $c'$ of the mixing chamber $c$ is avoided, and thereby the delay of action, which arises at the passing of the burning mixture through the contraction between the mixing chamber and additional combustion chamber, is substantially diminished.

Figure 2:
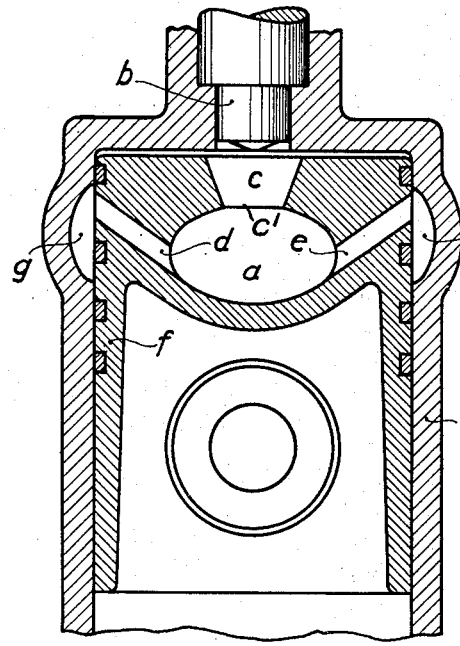

In the second form of construction illustrated in Fig. 2 the channels $d$ and $e$ lead from the additional combustion chamber in the piston to recesses or bypasses $g$ in the cylinder wall. Said recesses or bypasses $g$ are connected during the last part of the compression stroke, with the additional combustion chamber, however, not with the combustion chamber over the piston. However, as the piston $f$ recedes from its dead-center position, the point is reached where they form a communication between the additional combustion chamber and said combustion chamber extending above the piston. By this communication then again the combustion chamber can be more rapidly emptied, as described in the first form of construction.

Figure 3:
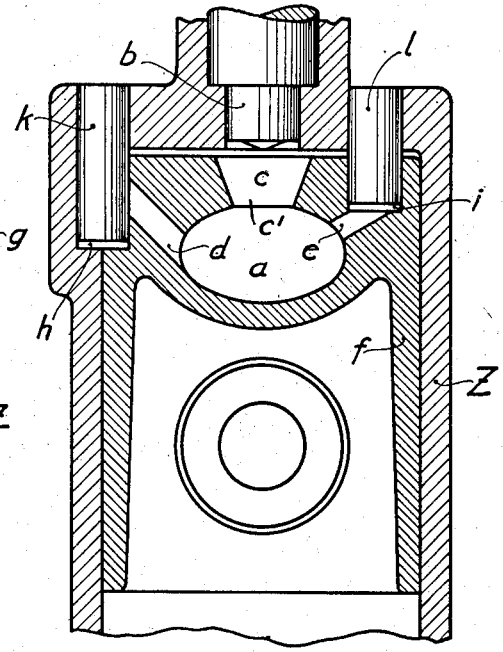

In the third modification shown in Fig. 3 the channels $e$ and $d$ lead from the additional combustion chamber within the piston into recesses $h$ and $i$ in the piston head. Said recesses extend parallel to the axis of the cylinder and are arranged opposite to projections $k$ and $l$ provided on the cover of the cylinder, said projections being formed in such a manner as to engage and fit into said recesses when the piston has reached the end of its stroke. Accordingly the projections open or close the channels $e$ and $d$ and thus regulate the communication of the additional combustion chamber with the cylinder space in the same manner and for the same purpose as in the previously described forms of construction.

The shape, position and member of the additional connection means of the additional combustion chamber with the remaining combustion chamber can be changed, as desired, within the scope of the present invention and also the order of succession of the opening of the individual connecting means.

In the illustrated forms of construction the mixing chamber $c$ and the additional combustion chamber $a$ are rigidly connected with each other and are provided on the same engine part, that means either on the cylinder or on the piston. Just as well, however, the invention can be applied to engines, in which the mixing chamber is fixedly arranged in the cover of the cylinder, while the additional combustion chamber is disposed within the piston head.

While I have herein shown and described the form and embodiment of my invention as illustrated in Figure 1 of the drawing in addition to the other forms of embodiment, for the purpose of a full disclosure of my invention, generically considered and claimed, I do not herein claim the same specifically, since it is so claimed in another concurrent application filed by me.

I claim:

1. An oil engine with fuel injection, comprising in combination a cylinder, a piston adapted to reciprocate in said cylinder, a fuel injection nozzle arranged in said cylinder, a mixing chamber, arranged in advance of the mouth of said injection nozzle and opening into the combustion chamber of the cylinder, a supplemental combustion chamber connected with said mixing chamber through a passage having a constricted throttling orifice, and additional passages, connecting the supplemental combustion chamber with the cylinder space and adapted to afford a further passage for the ignited mixture after a part of the working stroke of the piston in order to diminish throttling of the expansion of the ignited mixture out of the supplemental combustion chamber during the working stroke.

2. An oil engine with fuel injection, comprising in combination a cylinder, a piston adapted to reciprocate in said cylinder, a fuel injection nozzle arranged in said cylinder, a mixing chamber, arranged in advance of the mouth of said injection nozzle and opening into the combustion chamber of said cylinder, a supplemental combustion chamber connected with said mixing chamber through a passage having a constricted throttling orifice and additional passages, connecting the supplemental combustion chamber with the cylinder space and adapted to be regulated by the movement of said piston in such a manner that they afford periodically additional passages between the supplemental combustion chamber and the cylinder space.

3. An oil engine with fuel injection, comprising in combination a cylinder, a piston adapted to reciprocate in said cylinder, a fuel injection nozzle arranged in said cylinder, a mixing chamber, arranged in advance of the mouth of said injection nozzle and connected with the combustion chamber in the cylinder, a supplemental combustion chamber connected with said mixing chamber through a passage of throttling cross section and being arranged in said piston and channels provided in the wall of said cylinder, and passages connecting the supplemental combustion chamber with said channels and adapted to permit a portion of the contents of the supplemental combustion chamber to flow into the space above the piston during the working stroke of the latter.

4. An oil engine with fuel injection comprising, in combination, a cylinder, a piston adapted to reciprocate in said cylinder, a fuel-injection nozzle arranged in said cylinder, a mixing chamber arranged in advance of the mouth of said injection-nozzle and communicating with the combustion-chamber in the cylinder, a supplemental chamber arranged in the piston and communicating with the mixing chamber, an additional passage leading from said supplemental chamber into the cylinder space, and means for periodically opening and closing said additional passage by the movement of the piston.

5. In the combination as set forth in claim 4, a recess or by-pass formed in the cylinder walls arranged to communicate periodically with the cylinder space and the additional passage from the supplemental chamber in the piston, during the movement of the piston.

6. An oil engine with fuel ignition comprising a cylinder and a piston cooperating to form a compartment arranged to be reduced in volume by the piston, a second compartment of fixed value communicating with the first compartment by a passage tapering from the first compartment to the second compartment and a throttling constriction between the tapering passage and the second compartment, a fuel injector arranged in advance of the tapering passage to inject fuel into and toward the same, and an additional passage connecting said compartments, said additional passage adapted to be opened and closed by movement of said piston.

7. An oil engine with self-ignition comprising a cylinder and a piston cooperating to form a chamber arranged to be reduced in volume by the piston, a second compartment of fixed volume formed in the piston, a mixing chamber arranged between and opening into the first and second chambers, a fuel nozzle arranged to inject fuel into and toward said mixing chamber, and additional passage means for periodically connecting said first and second chambers.

8. An oil engine as set out in claim 7 in which the mixing chamber is a funnel-shaped passage tapering from the first chamber to the second chamber with a throttling constriction at the junction of said mixing chamber and said second chamber.

In testimony whereof I have hereunto affixed my signature.

FRANZ LANG.

CERTIFICATE OF CORRECTION.

Patent No. 1,759,161.  Granted May 20, 1930, to

FRANZ LANG.

It is hereby certified that error appears in the printed specification of the above numbered patent requiring correction as follows: Page 3, line 13, claim 6, for the word "value" read volume; and that the said Letters Patent should be read with this correction therein that the same may conform to the record of the case in the Patent Office.

Signed and sealed this 21st day of October, A. D. 1930.

(Seal)

M. J. Moore,
Acting Commissioner of Patents.